US010311877B2

(12) United States Patent
Lee et al.

(10) Patent No.: US 10,311,877 B2
(45) Date of Patent: Jun. 4, 2019

(54) PERFORMING TASKS AND RETURNING AUDIO AND VISUAL ANSWERS BASED ON VOICE COMMAND

(71) Applicant: KT CORPORATION, Gyeonggi-do (KR)

(72) Inventors: Sang-Wook Lee, Seoul (KR); Du-Seong Chang, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/641,843

(22) Filed: Jul. 5, 2017

(65) Prior Publication Data
US 2018/0005631 A1    Jan. 4, 2018

(30) Foreign Application Priority Data

Jul. 4, 2016    (KR) .................. 10-2016-0084032

(51) Int. Cl.
*G10L 15/30*    (2013.01)
*G10L 15/08*    (2006.01)
*G10L 15/22*    (2006.01)

(52) U.S. Cl.
CPC .............. *G10L 15/30* (2013.01); *G10L 15/08* (2013.01); *G10L 15/22* (2013.01); *G10L 2015/088* (2013.01); *G10L 2015/223* (2013.01)

(58) Field of Classification Search
CPC ...................................... G10L 15/30
USPC ....................................... 704/251
See application file for complete search history.

(56) References Cited

U.S. PATENT DOCUMENTS

| 5,777,614 A | 7/1998 | Ando et al. |
| 6,570,555 B1 | 5/2003 | Prevost et al. |
| 6,570,588 B1 | 5/2003 | Ando et al. |
| 7,426,467 B2 | 9/2008 | Nashida et al. |
| 9,199,122 B2 | 12/2015 | Kaleal, III et al. |
| 9,691,221 B2 | 6/2017 | Block et al. |
| 2002/0111794 A1 | 8/2002 | Yamamoto et al. |

(Continued)

FOREIGN PATENT DOCUMENTS

| CN | 105046238 A | 11/2015 |
| JP | 08-166866 A | 6/1996 |

(Continued)

*Primary Examiner* — Susan I McFadden
(74) *Attorney, Agent, or Firm* — IP Legal Services, LLC

(57) ABSTRACT

An artificial intelligence voice interactive system may provide various services to a user in response to a voice command by providing an interface between the system and a legacy system to enable providing various types of existing services in response to user speech without modifying systems for the existing services. Such system includes a central server, and the central server may perform operations of registering a plurality of service servers at the central server and storing registration information of each service server, analyzing voice command data from the user device and determining at least one task and corresponding service servers based on the analysis results, generating an instruction message based on the voice command data, the determined at least one task, and the registration information of the selected service servers, and transmitting the generated instruction message to the selected service servers, and receiving task results including audio and video data from the selected service servers and outputting the task results through at least one device associated with the user device.

15 Claims, 11 Drawing Sheets

(56) References Cited

U.S. PATENT DOCUMENTS

| | | |
|---|---|---|
| 2003/0220799 A1 | 11/2003 | Kim et al. |
| 2007/0120959 A1 | 5/2007 | Wu et al. |
| 2008/0183678 A1 | 7/2008 | Weston et al. |
| 2010/0153868 A1 | 6/2010 | Allen et al. |
| 2011/0201414 A1 | 8/2011 | Barclay et al. |
| 2011/0288868 A1 | 11/2011 | Lloyd et al. |
| 2012/0022874 A1 | 1/2012 | Lloyd et al. |
| 2012/0278076 A1 | 11/2012 | Lloyd et al. |
| 2013/0035790 A1 | 2/2013 | Olivier, III et al. |
| 2013/0325466 A1 | 12/2013 | Babin |
| 2014/0143809 A1 | 5/2014 | Sung et al. |
| 2014/0278403 A1 | 9/2014 | Jacob et al. |
| 2015/0217199 A1 | 8/2015 | Cotter |
| 2015/0256873 A1 | 9/2015 | Klein et al. |
| 2015/0290795 A1 | 10/2015 | Oleynik |
| 2015/0379752 A1 | 12/2015 | Li et al. |
| 2016/0034458 A1 | 2/2016 | Choi et al. |
| 2016/0140960 A1 | 5/2016 | Chae |
| 2016/0174074 A1 | 6/2016 | Kim et al. |
| 2016/0210602 A1 | 7/2016 | Siddique et al. |
| 2016/0328014 A1 | 11/2016 | Huang et al. |
| 2017/0206797 A1 | 7/2017 | Solomon et al. |
| 2017/0264954 A1 | 9/2017 | Nakagawa et al. |
| 2018/0018793 A1 | 1/2018 | Min et al. |
| 2018/0019000 A1 | 1/2018 | Delpuch et al. |
| 2018/0054612 A1 | 2/2018 | Kim et al. |
| 2018/0067381 A1 | 3/2018 | Aflatooni |

FOREIGN PATENT DOCUMENTS

| | | |
|---|---|---|
| JP | 10-020884 A | 1/1998 |
| JP | 2004-005530 A | 1/2004 |
| JP | 2006-317722 A | 11/2006 |
| JP | 2014-191272 A | 10/2014 |
| JP | 2015-060391 A | 3/2015 |
| KR | 10-0331033 B1 | 4/2002 |
| KR | 10-0644027 B1 | 11/2006 |
| KR | 10-0768653 B1 | 10/2007 |
| KR | 10-2008-0099883 A | 11/2008 |
| KR | 10-2009-0092946 A | 9/2009 |
| KR | 10-0955247 B1 | 4/2010 |
| KR | 10-2011-0059178 A | 6/2011 |
| KR | 10-2013-0113307 A | 10/2013 |
| KR | 10-2013-0137332 A | 12/2013 |
| KR | 10-1339684 B1 | 12/2013 |
| KR | 10-2014-0066025 A | 5/2014 |
| KR | 10-2016-0011620 A | 2/2016 |
| KR | 10-2016-0014926 A | 2/2016 |
| KR | 10-2016-0058523 A | 5/2016 |
| KR | 10-2016-0071111 A | 6/2016 |

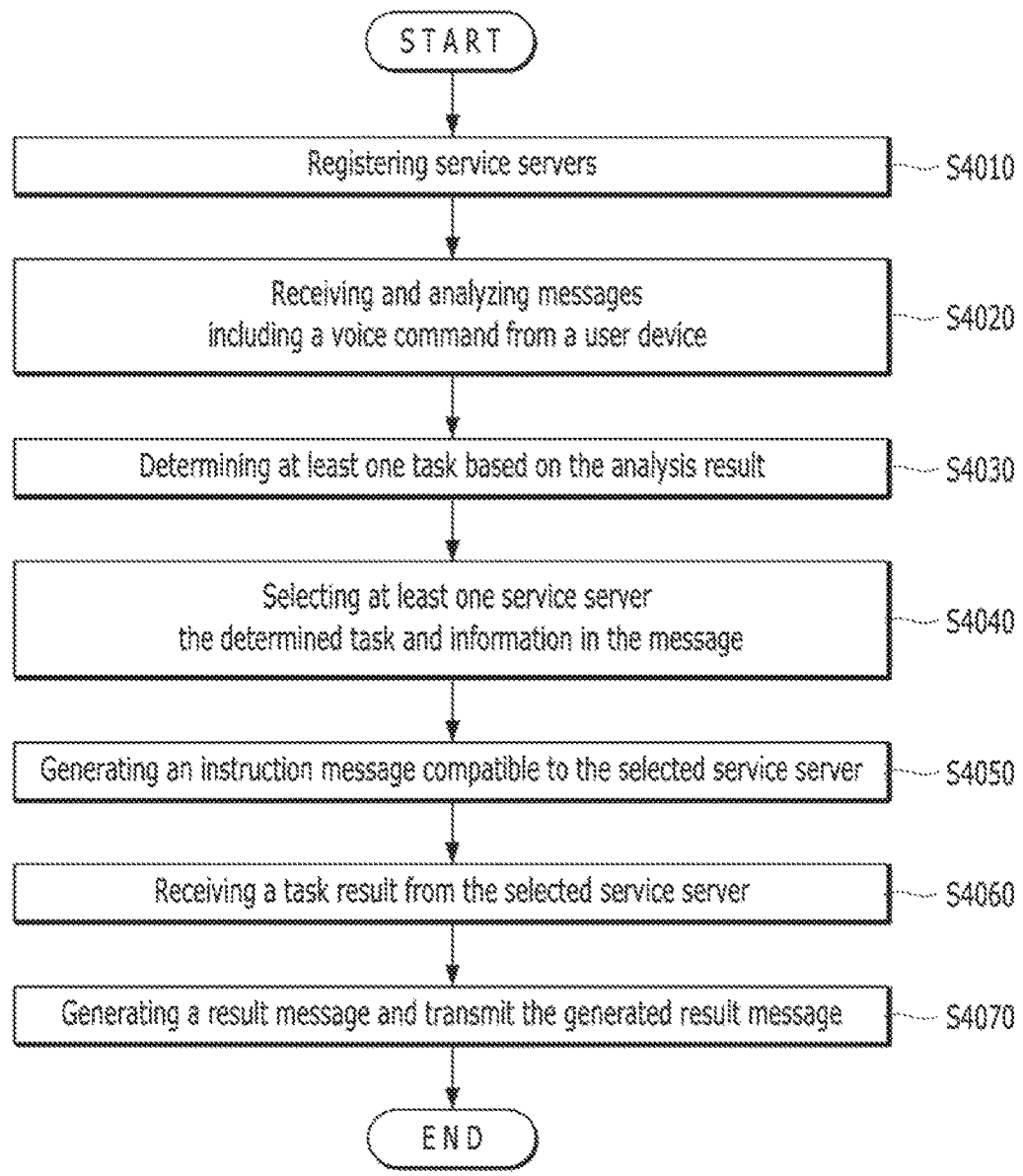

FIG. 5

| Service Server 501 | Task type 502 | Service initiation Word 503 | Service initiation sentence 504 | Sentence pattern 505 | Keyword 506 | Address 507 | Message format 508 |
|---|---|---|---|---|---|---|---|
| Food service server 301 | Order (Pizza) food | Pizza | "...order pizza..." | ** Pizza ** | Pizza, Order, Spaghetti, | www.pizza.n et | FIG. 11,12 |
| Weather service server 302 | Provide local weather info | Weather | "...what is weather in..." | ** Weather ** | Weather, temperature, rain, windy | 192.234.43.2 | FIG. 11,12 |
| Transportation service server 303 | Reserve and purchase a ticket for transportaion | Ticket | "...reserve a seat for a train..." | ** Train ** | Train, Ticket, Seat, | 32.211.2.43 | FIG. 11,12 |

| Service Server | Task type | Essential information | |
|---|---|---|---|
| Weather server 301 | Collect weather information | Date | 931 |
| | | Region | 932 |
| Food service server 302 | Order foods | Name | 933 |
| | | Address | 934 |
| | | Menu | 935 |
| | | Payment information | 936 |
| Transportation service server 303 | Buy a train ticket | Destination | 937 |
| | | Origin | 938 |
| | | Date and time | 939 |
| | | Payment information | 940 |

FIG. 11

Instruction message (Request message) 10

| Request parameter 11 | | Description 12 | Essential Data? 13 | Example 14 |
|---|---|---|---|---|
| Trid | | Identification of transaction | Yes | |
| Vendorid | | Identification of vendor (service provider of service server) | Yes | Vd0000xx |
| Vserviceid | | Identification of service (task or service provided by service server) | Yes | Vs0000xx |
| Intent | | Intention of a user | Yes | QureyStock |
| reqmsg | | Original speech recorded as a Voice command | Yes | Tell me a current price of a stock of Samsung electronics |
| param | slotName slotValue | Keyword required for service (task) | | {slotName:StockName,slotvalue:Samsung electronics} |
| status | | Context information | | |
| uinfo | | User preference information | | |
| id | | Personal identification | Yes | User 1 |
| Sa_id | | Olleh tv STB said (identificaltion of a service provider of a user device and central server) | Yes | HE06110176 |
| history | | Result of previous services or tasks | Json format | |

FIG. 12

Result message (Response message) 20

| Request parameter 21 | | Description 22 | Example 23 |
|---|---|---|---|
| Trid | | Identification of transaction | Vd0000xx |
| Vendorid | | Identification of vendor (service provider of service server) | Vd0000xx |
| Vserviceid | | Identification of service (task or service provided by service server) | Vs0000xx |
| SysAct | | System action (operation performed by a service server) | QureyStock |
| Viewtype | | User interface type (device type of outputting results) | SimpleTTS[ConfirmUI]SelectUI |
| UserMesg | | Original speech recorded as a Voice command | Tell me a current price of a stock of Samsung electronics |
| Sys Template | | Contents of response message from system (e.g., service server) | "the current stock price of Samsung electronics is 250 dollars" |
| CS | Feature | KEY will be used for a real service | "CS":[( <br> "Feature":"StockName", <br> "Value":"Samsung Electronics" <br> },{ <br> "Feature":"StockValue", <br> "Value":"$250.00" <br> }] |
| | Value | A value mapped to KEY | |

PERFORMING TASKS AND RETURNING AUDIO AND VISUAL ANSWERS BASED ON VOICE COMMAND

CROSS REFERENCE TO PRIOR APPLICATIONS

The present application claims priority under 35 U.S.C. § 119 to Korean Patent Application No. 10-2016-0084032 (filed on Jul. 4, 2016).

BACKGROUND

The present disclosure relates to performing tasks based on voice commands and, more particularly, to performing various tasks in response to a voice command and providing audio and visual results by cooperating with legacy systems.

Due to advances in speech recognition technology, major electronics manufacturers have introduced many electronic devices capable of performing tasks in response to user's voice command. Through such electronic devices, a user may perform simple tasks. However, there are many restrictions in using services of legacy systems, which have been provided in a traditional manner requiring a significant amount of human intervening.

SUMMARY

In accordance with an aspect of the present embodiment, an artificial intelligence voice interactive system may recognize a voice command from user speech and perform associated tasks in cooperation with legacy systems through service servers.

In accordance with another aspect of the present embodiment, an artificial intelligence voice interactive system may perform various tasks based on recognized voice commands in user speech and provide a user with audio and video results through various associated devices.

In accordance with still another aspect of the present embodiment, an artificial intelligence voice interactive system may provide an interface between the voice interactive system and legacy systems to enable providing various types of existing services provided by the legacy systems in response to user speech without modifying the legacy systems.

In accordance with further still another aspect of the present embodiment, an artificial intelligence voice interactive system may enable a user to use various services provided by a legacy system by providing an interface between a registered service server and the legacy system to enable the artificial intelligence voice interactive system to cooperate the legacy system through the registered service server.

In accordance with at least one embodiment, a method may be provided for providing voice interactive services to a user through an artificial intelligence voice interactive system including a central server and a plurality of service servers each connected to the central server through a communication network. The method of the central server may include performing a registration operation upon generation of a predetermined event for registering the service servers and storing registration information of each registered service server; receiving voice command data, determining at least one task to perform based on the voice command data, and selecting at least one of the registered service servers based on the determined task; generating an instruction message based on the voice command data, the determined at least one task, and the registration information of the selected service server, and transmitting the generated instruction message to the selected service server; and receiving a result message including audio and video data from the selected service server and outputting the audio and video data through at least one device.

The predetermined event may include i) receiving a request message from at least one of the plurality of service servers, ii) receiving a request message from a user of the user device, iii) requesting the plurality of service servers to transmit registration information, and iv) regularly collecting the registration information from the plurality of service servers.

The registration information of each registered service server may include at least one of information on tasks to perform, service identification words, a communication address, and message formats.

The instruction message may be generated based on a message format based on the registration information of the selected service sever in order to cooperate with a non-voice interactive system to perform the determined task.

The determining whether the received voice command data may be related to an internal task or an external task based on service identification words included in the received voice data.

The received voice command data may include at least one of service identification words, the received voice command data is for requesting the external task that requires one of the registered service servers.

The selecting may include: determining whether the voice command data includes one of service initiation words, service initiation sentences, sentence patterns, and keywords of the registered service servers based on the stored registration information of the registered service servers; and selecting at least one service server mapped to the one included in the voice command data.

The selecting may include applying a predetermined selection order to select a service server; and the predetermined selection order is to firstly select one associated with the service initiation word, secondly select one associated with the service initiation sentence, thirdly select one associated with the sentence pattern, and lastly select one associated with the keyword.

The selecting may include determining whether the voice command data includes one of a service initiation word and a service initiation sentence of the registered service servers; and when the voice command data include at least one of the service initiation word and the service initiation sentence, selecting a service server mapped to at least one of the service initiation word and the service initiation sentence.

The selecting may include when more than two service servers are capable of performing the determined task associated with the voice command data, selecting at least one of the two service servers based on a predetermined selection condition.

The selecting may include when one of a keyword and a sentence pattern included in the voice command data is mapped to more than two service servers, determining that more than two service servers are capable of performing the determined task associated with the voice command.

The predetermined selection conditions may be one of i) selecting one assigned with a higher priority than the others among the plurality of service servers, ii) selecting one previously selected more times than the others among the plurality of service servers, and iii) selecting one set as a default service server.

The registering may include storing task essential information for performing a task of each registered service server. In this case, the method may further includes: requesting additional information to the user device when the voice command data does not include task essential information for performing the determined task associated with the voice command data.

In accordance with another embodiment, a non-transitory machine-readable medium, having encoded thereon program code, wherein, when the program code is executed by a machine, may be provided. The machine may implement a method for providing voice interactive services to a user through an artificial intelligence voice interactive system including a central server and a plurality of service servers each connected to the central server through a communication network. The method of the central server may include performing a registration operation upon generation of a predetermined event for registering the service servers and storing registration information of each registered service server; receiving voice command data, determining at least one task to perform based on the voice command data, and selecting at least one of the registered service servers based on the determined task; generating an instruction message based on the voice command data, the determined at least one task, and the registration information of the selected service server, and transmitting the generated instruction message to the selected service server; and receiving a result message including audio and video data from the selected service server and outputting the audio and video data through at least one device.

BRIEF DESCRIPTION OF THE DRAWINGS

FIG. 4 is a flowchart illustrating overall operation of a central server accordance with at least one embodiment;

FIG. 5 illustrates registration information of each service server, registered and stored at a central server in accordance with at least one embodiment;

FIG. 11 and FIG. 12 are tables illustrating formats and parameters of an instruction message and a result message in accordance with at least one embodiment.

DETAILED DESCRIPTION OF EMBODIMENTS

In accordance with at least one embodiment, an artificial intelligence voice interactive system may be provided to provide various services of legacy systems to a user in response to a voice command. The artificial intelligence voice interactive system may provide an interface between a voice interactive system and a legacy system (e.g., non-voice interactive system) to provide various types of existing services provided by the legacy system in response to user speech without modifying the legacy system.

For example, the artificial intelligence voice interactive system may i) recognize at least one voice command from user speech, ii) determine at least one task in the voice command, iii) select at least one service server associated with the determined task, iv) perform various types of voice interactive tasks through the selected service server in cooperation with associated legacy systems, and v) provide audio and visual results through at least one devices. In order to provide such artificial intelligence voice interactive services and tasks, the artificial intelligence voice interactive system may include a user device, a central server, and a plurality of service servers each connected to related legacy systems. Herein, the voice interactive task may require a legacy system perform entirely or partially a user' requested service, but not limited thereto. Such a system will be described in more detail with reference to FIG. 1.

Figure 1:
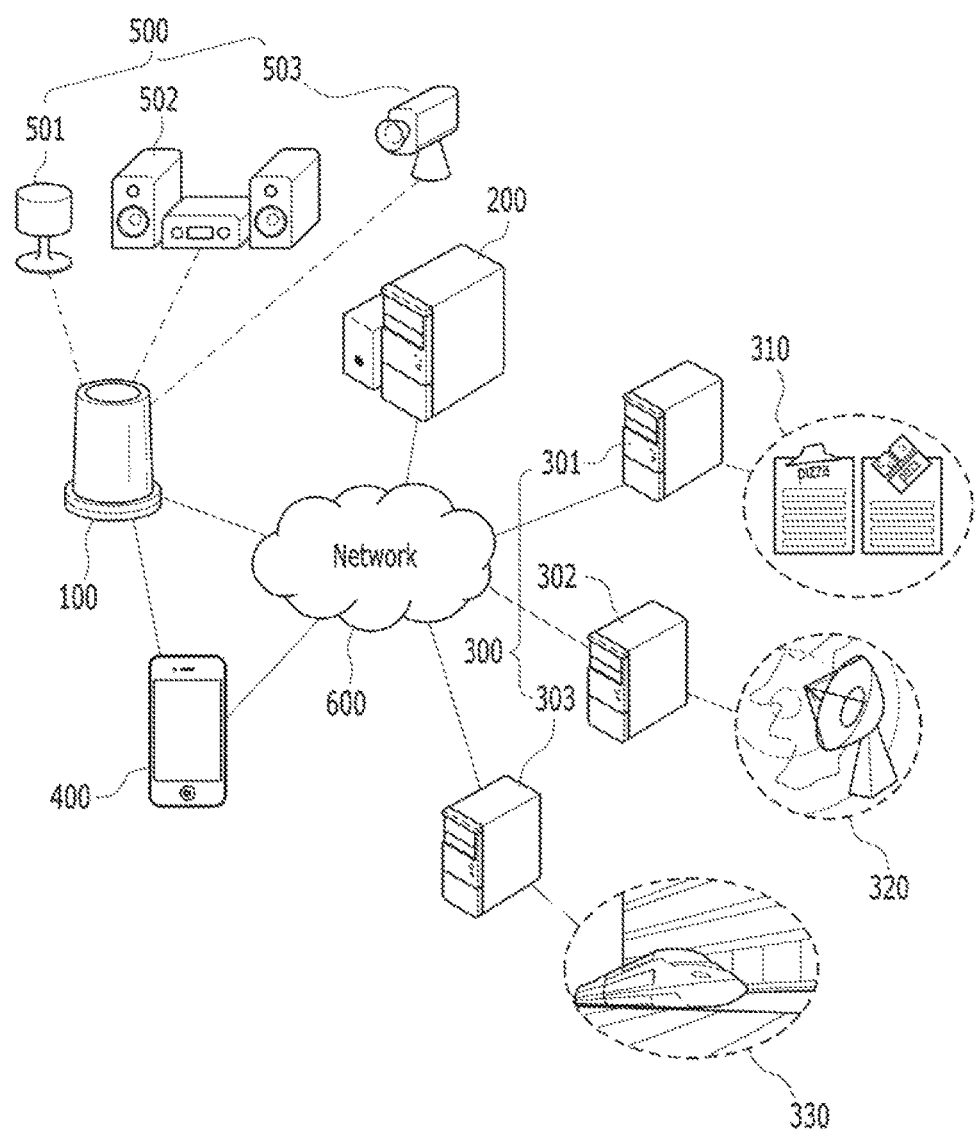
FIG. 1 illustrates an artificial intelligence voice interactive system in accordance with at least one embodiment.

FIG. 1 illustrates an artificial intelligence voice interactive system in accordance with at least one embodiment. Referring to FIG. 1, the artificial intelligence voice interactive system may include user device 100, central server 200, and a plurality of service servers 300 (301 to 30N) in accordance with at least one embodiment.

User device 100 may listen to speech made around thereof, recognize at least one voice command from the speech, and transfer the recognized voice command to central server 200. Such user device 100 is an electronic device that i) includes at least one processor, a memory, and a communication circuit and ii) is capable of performing various operations for listening to speech, recognizing at least voice command from the speech, and transferring the recognized command to other devices through communication network 600. For example, user device 100 may include a smart phone, a notebook computer, a tablet personal computer (PC), a smartwatch, and a desktop computer. However, the embodiments of the present disclosure are not limited thereto. User device 100 may be any electronic device including at least one processor, a memory, and a communication circuit for performing the above-mentioned tasks, such as recognizing voice commands and transferring the voice commands to central server. In addition, user device 100 may be designed and manufactured dedicatedly for providing voice interactive services in response to user command using artificial intelligence voice interactive technology. Further, such user device 100 may be produced as software program codes and installed in other devices, but the present embodiments are not limited thereto.

For example, user device 100 may be installed or deployed at a predetermined location, as a stationary device and connected to a communication network for communicating with other entities such as Internet of Things (IoT) devices 500, smart phone 400 of a user, central server 200, and service servers 300. However, user device 100 may be a portable device carried with a user. After user device 100 is turned on (powered on), user device 100 may always listen to sound or speech generated within a predetermined area. User device 100 may recognize at least one voice command from the sound or speech. For example, user device 100 recognizes a voice command when user device 100 detect a predetermined word (e.g., a wake-up word or initiation word) in the speech. User device 100 may recognize a certain length of a speech after the wake-up word as a voice command, record it, and store it as a certain format of data.

User device 100 may generate a message including information (e.g., certain format of binary data) on the recognized voice commands (e.g., user speech recorded in a certain data format) and transmit the generated message to central server 200 through communication network 600. The information may include text data or audio data of the recognized voice command. In addition, user device 100 may packetize supplementary information into the message, such as user identification information, device identification information, and so forth. The supplementary information may be context data (e.g., current status of user device or surroundings thereof). Such configuration and operation of user device 100 will be described more detail later with accompanying drawings.

In accordance with at least one embodiment, central server 200 may be a computing system connected to user device 100 and a plurality of service servers 300 through communication network 600. Such central server 200 may be located at a remote place from user device 100. For example, central server 200 is located at a central building of a service provider. Central server 200 may be a computing system including at least one processor, at least one memory, and at least one communication circuit for performing operations for providing artificial intelligence voice interactive services in cooperation with legacy systems based on a voice command. For example, central server 200 may perform operations of receiving a recognized voice command from user device 100, analyzing the received voice command, determining at least one of tasks based on the analysis result, determining whether the determined tasks are an internal task or an external task, performing the determined tasks using at least one of service servers 300 each associated with legacy system and transmitting audio and video results of performing tasks through various devices around a user. Herein, the external task is a task requiring at least one of service servers 300 to perform necessary operations. The internal task is a task not requiring any of service servers 300 to perform necessary operations of the determined task. That is, the external task may be a service used to be provided by a legacy system.

When central server 200 determines that the requested task is the external task, central server 200 may generate an instruction message in a predetermined standard format based on registration information of a corresponding service server and transmit the generated instruction message to the corresponding service server. Such a format and parameters for the instruction message may be predetermined by at least one of service providers (e.g., system designers, operators, and manufacturer) of central server 200 and service servers 300 to cooperate with associated legacy systems. For example, central server 200 may provide a standard message format to various service servers (e.g., vendors) and request service servers to generate a message according to the standard message format in order to communicate to each other and provide a voice interactive interface to non-voice interactive systems. Further, central server 200 may request service servers 300 to upload information about what information is required from a user or a user's vice command to perform to operations (e.g., tasks) for providing legacy services of service servers 300. That is, central server 200 may convert a voice interactive command to a certain format of a message (e.g., instruction message) that can be interpreted by legacy systems or non-voice interactive systems. Formats and information (parameters) of the instruction message will be described in detail with reference to FIG. 11 and FIG. 12.

For convenience for description and ease of understanding, user device 100 is an independent device from central server 200 in at least one embodiment of the present disclosure. However, the embodiments of the present disclosure are not limited thereto. User device 100 may include all the functions of central server 200, or user device 100 and central server 200 may be implemented as one device in another embodiment of the present disclosure. Configuration and operations of central server 200 will be described in more detail in later with accompanying drawings.

In accordance with at least one embodiment, service servers 300 may be a computing system for performing a task in cooperation with legacy systems for providing a legacy service or a non-voice interactive service in response to a voice command and providing audio and video results of performing the task to at least one of user device 100 and central server 200. For example, service servers 300 may be a non-voice interactive system that does not have functions for recognizing and responding to user speech. For example, service servers 300 may include i) food service server 301 for electrically or digitally ordering foods from existing, typical, and traditional restaurants 310 and physically delivering the ordered foods to a predetermined location, weather service server 302 for requesting weather information to a predetermined organization 320 (e.g., local weather station or broadcasting center) and informing of a user the requested weather information, and iii) transportation service server 303 for electrically or digitally reserving seats of a predetermined transportation and purchasing tickets thereof from a train station or an airport 330. A typical food delivery system (e.g., legacy system) provides a web-page (e.g., typical interface) to a user for ordering a pizza, and the user has to manually fill up the web-page with detail information to order the pizza. Such a legacy system (e.g., typical food delivery system) is not a voice interactive system. That is, such a service server associated with a legacy system does not have an interface cooperating with a voice interactive system. In accordance with at least one embodiment, service servers 300 may be an interface between the voice interactive system (e.g., c service 200) and the legacy system (e.g., legacy systems 310, 320, and 330) to provide various types of services of the legacy system to users without modifying the existing legacy systems. In FIG. 1, legacy systems 310, 320, and 330 are illustrated different and independent systems from service servers 301, 302, and 303. However, the embodiments of the present disclosure are not limited thereto. For example, a service server may be a legacy system. That is, a service server is a non-voice interactive system that provide a service in a typical online manner, for example, requiring a user to manually fill up an associated web-site for providing a certain service.

Further, such service servers 300 may be a computer system owned by a service provider different from that of central server 200. Accordingly, service servers 300 may have identification different from that of central server 200. That is, service servers 300 may be installed or deployed at remote places from central server 200. Since service servers 300 are owned and operated by different service providers from central server 200, service servers 300 and central server 200 may cooperate together based on agreements made between two parties. Accordingly, communication between central server 200 and service server 300 may use communication networks and schemes different from i) internal communication in one computing system owned and operated by one service provider, and ii) communication between central server 200 and user device 100.

In accordance with at least one embodiment, service servers 300 may be registered at central server 100. Upon the registration, service servers 300 may provide central server 200 with information to perform tasks (e.g., services) of service server 300. That is, service server 300 may upload essential information to central server 200. The essential information may be i) information required to perform tasks or services (e.g., legacy services) and ii) information required to identify one service server from the others. Such registration information may include tasks (e.g., services) to perform, service identification words, essential information to perform tasks in cooperation with associated legacy systems, message formats to communicate with central server 200 and digitally receive instructions and digitally transmit results thereof, and likes. For example, service servers 300 may be $3^{rd}$ party computing systems that i) are designed to provide digital solutions to associated legacy systems, and ii) have a predetermined contract with the artificial intelligence voice interactive system.

In accordance with at least one embodiment, service servers 300 may receive an instruction message from central server 200, perform a task based on information in the instruction message in cooperation with legacy systems, generate a result message based on the registration information of corresponding service servers 300, and transmit the result message to at least one of user device 100 and central server 200. As described, the instruction message may be generated by central server 200 based on the registration information of corresponding service server 300. Accordingly, service server 300 may convert information in the instruction message to cooperate with legacy systems, for example, digitally and automatically filling up a pizza order page of a web-page of a pizza service server (e.g., legacy system) and place an order of a pizza in response to a voice command entered in user device 100. After performing the task, service servers 300 generates a result message based on the registration information. Formats and information (e.g. parameters) of such a result message will be described with reference to FIG. 11 and FIG. 12.

Meanwhile, user device 100, central server 200, and a plurality of service servers 300 are communicated with each other through communication network 600. Communication network 600 may be any wired and wireless network that digitally connects user device 100, central server 200, a plurality of service servers 300, and smart phone 400 to enable them to digitally communicate to each other. In particular, network 600 may include a local area network (LAN), metropolitan area network (MAN), or wide area network (WAN). As described, communication network 600 between user device 100 and central server 200 may be different from communication network 600 between central server 200 and service servers 300. Further, a communication scheme used between user device 100 and central server 200 may be different from a communication scheme used between central server 200 and service servers 300.

As described, the artificial intelligence voice interactive system may provide various services to a user in response to a voice command (e.g., speech) with cooperation with a plurality of service servers in accordance with at least one embodiment. As described, various services may include legacy services used to be provided by legacy systems. Hereafter, overall operation of the artificial intelligence voice interactive system will be described with reference to FIG. 2.

Figure 2:
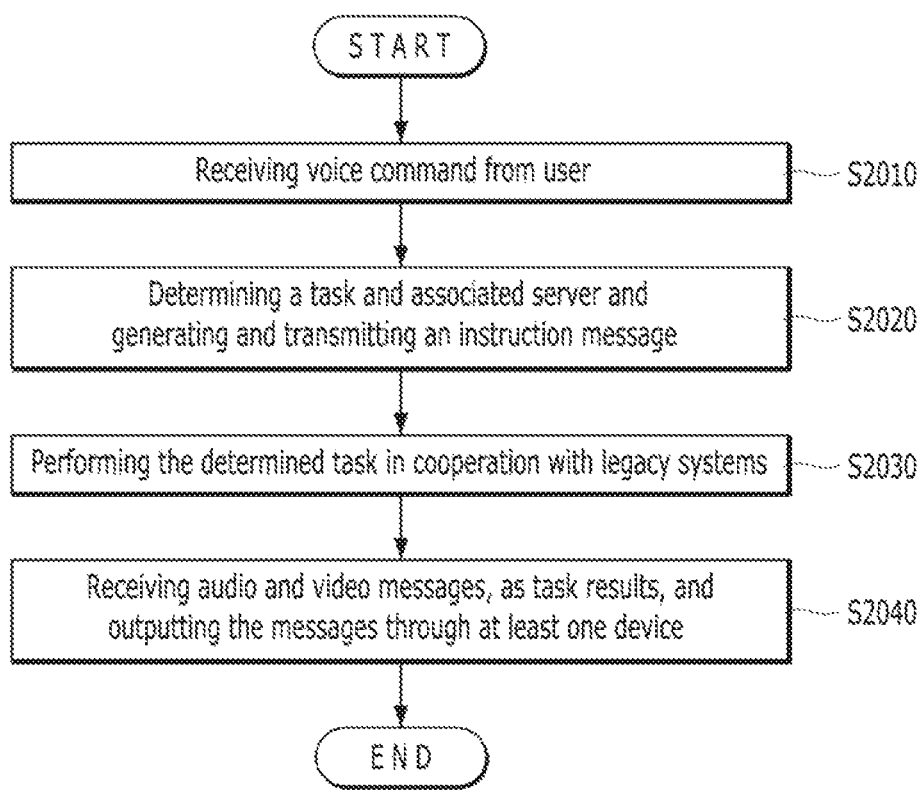
FIG. 2 is a flowchart illustrating overall operation of an artificial intelligence voice interactive system in accordance with at least one embodiment of the present disclosure.

FIG. 2 is a flowchart illustrating overall operation of an artificial intelligence voice interactive system in accordance with at least one embodiment of the present disclosure. Referring to FIG. 2, a voice command may be received from a user at step S2010. For example, after user device 100 is installed and powered on, user device 100 listens speech or sound generated at a predetermined area, recognizes a voice command included in the speech or the sound, generates data corresponding to the voice command, and transmits the generated data to central server 200.

At step S2020, i) at least one task to be performed may be determined and ii) at least one service server to perform the task (e.g., if necessary) may be selected based on the received data. Further, iii) an instruction message may be generated based on the determined task, the selected service server, and registration information of the selected server, and iv) the generated instruction message may be transmitted to the selected service server. For example, central server 200 receives the data including information on the received voice command and supplementary information from user device 100. The data may be audio data that recording speech for a predetermined duration after detecting a wakeup word. The supplementary information may be information on identification of user device 100, identification of a user making speech, a current status of user device 100, a location of user device 100, context information of user device 100 (e.g., collectable information about surroundings of user device 100, such as temperature, pictures, sounds, sending signals, so forth). Central server 200 analyzes the received data, determines at least one task to be performed based on the analysis result, and selects at least one service server based on the determined task if the determined task is an external task requiring one of service servers 300 to perform the task. If the task is an internal task, central server 200 and user device 100 may perform operations related to the determined task without using service servers 300. Central server 200 i) generates an instruction message in a predetermined format compatible with the selected service server based on the determined task, the selected service server, the registration information of the selected service server, and information included in the voice command and ii) transmits the generated instruction message to the selected service server through a communication network. As described, the instruction message may be generated according to formats and parameters included in the registration information of the selected service server. Accordingly, based on the instruction message, service servers 300 may cooperate with legacy systems and provide servers of the legacy systems to the user in response to a voice command although the legacy system cannot be interactive with a voice command.

At step S2030, the determined task may be performed through the selected service server. For example, the selected service server receives the generated instruction message, analyzes the received instruction message, and performs operations to perform the determined task based on the analysis result independently or in cooperation with legacy systems for providing the request services, such as ordering pizzas, checking local weather, purchasing a train ticket, so forth.

At step S2040, a result of performing the determined task may be provided and outputted through at least one of associated devices. For example, the selected service server may generate result messages including audio messages and/or video messages based on the result of performing the tasks and according to formats and parameters included in the registration information and transmit the generated messages to central server 200. Central server 200 receives the result messages including the audio and video messages from the service server, transmits the result messages including audio and video messages, entirely or partially to user device 100, and directly or indirectly outputs the audio and video messages through at least one associated device including user device 100 (e.g., speakers and displays associated with user device 100). In accordance with another embodiment, service servers 300 may generate and transmit a response message to central server 200 in response to the instruction message. The response message may not include all the information including audio and video data, as a result of performing the determined task. The response message may be an ACK message in response to the instruction message, but the present embodiments are not limited thereto. Furthermore, the result message may not include audio and video messages. In this case, at least one of central server 200 and user device 100 may generate audio and video message based on the information included in the result message.

As described, the artificial intelligence voice interactive system may provide various types of services to a user in response to a voice command by providing an interface between central server 200 and legacy systems through service servers 300 in accordance with at least one embodiment. Hereinafter, detailed operations of each constituent element in the artificial intelligence voice interactive system will be described with reference to the accompanying drawings. At first, detailed operations of use device 100 will be described as follow.

User device 100, as described, may recognize a voice command from speech made by a user and transmit the recognized voice command to central server 200 in accordance with at least ogre embodiment. Hereinafter, operations of user device 100 will be described in more detail with reference to FIG. 3. For convenience and ease of understanding user device 100 is described as a device dedicatedly designed and manufactured to listen and recognize a voice command without additional user action such as clicking or pushing a predetermined hardware button of the device or touching a predetermined virtual button displayed on a touch screen of the device. However, the embodiments of the present disclosure are not limited thereto. For example, user device 100 may be any devices capable of receiving, recording a voice command, and transmitting data of the voice command to the other entities. For example, as described, and not limited to, user device 100 may be a smart phone, a tablet, a laptop computer, and likes.

Figure 3:
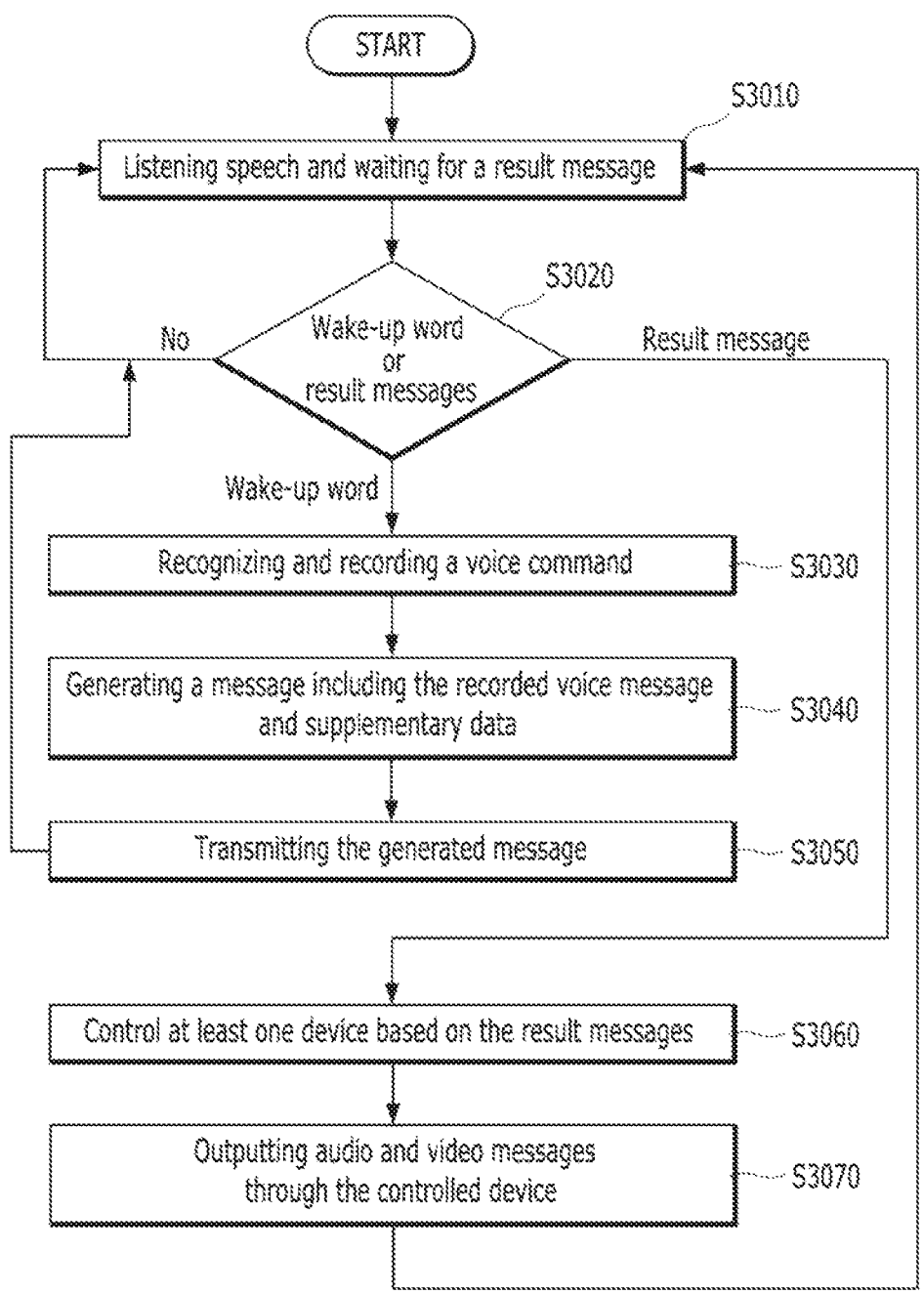
FIG. 3 is a flowchart illustrating operation of a user device in accordance with at least one embodiment.

FIG. 3 is a flowchart illustrating operation of a user device in accordance with at least one embodiment.

Referring to FIG. 3, user device 100 may listen to speech made around user device 100 at step S3010. For example, user device 100 is installed or deployed at a predetermined location (e.g., living room), powered on, connected to communication network 600 (e.g., Internet), and registered at central server 200. Such operations may be performed through a companion application installed at the other device, such as a smart phone. For another example, user device 100 may be carried with a user. Further, user device 100 may have an interface to enable a user to directly perform setups and register it at central server 200. After powered on, setup, and registration, user device 100 always listens to sound or speech. However, the embodiments of the present disclosure are not limited thereto. For another embodiment, user device 100 may listen to or receive speech voice command) upon generation of a predetermined event. The present event may include clicking, pushing, or touching a predetermine button of user device 100. The predetermined button may be a virtual icon displayed on a touch screen (not shown) of user device 100.

In addition, user device 100 may wait for a result message from at least one of central server 200, service servers 300, or other entities including legacy systems connected through communication network 600 at step S3010. For example, after performing a task associated with a voice command of a user, user device 100 receives at least one of audio messages or video messages as a result of performing the task and outputs the audio and/or video message through at least one of devices, such as speakers equipped in user device 100 and a display connected to user device 100 or central server 200.

At step S3020, user device 100 may determine whether a wake-up is included in the speech or whether a result message is received. That is, user device 100 performs an operation for receiving and recording a voice command (e.g., voice command receiving operation) upon generation of a predetermined event. Such a predetermined event may include recognition of a wake-up word. The wake-up word may be a word (e.g., or sentence) designated as a wake-up word for initiating an artificial intelligence voice interaction task. As a first operation of the artificial intelligence voice interaction task, user device 100 performs the voice command receiving operation. For example, when user device 100 recognizes a wake-up word while listening to speech, user device 100 starts recording speech after the wake-up word for predetermined duration (e.g., 30 seconds), When user device 100 recognizes a wake-up word (Yes—S3020), user device 100 may recognize speech of a certain period time after the wake-up word as a voice command and records the recognized voice command in a predetermined format g mpeg or way) at step S3030. For another example, user device 100 may recognize speech tight after the wake-up word till no sound for 5 seconds.

At step S3040, user device 100 may generate a message including the recorded voice command and supplementary information.

At step S3050, user device 100 may Transmits the generated message to central server 200 through communication network 600.

Referring back to step S3020, user device 100 may receive a result message directly or indirectly from at least one of central server 200 and service servers 300. In this case (result message—S3020), user device 100 may control at least one device based on the result message at step S3060 and output video or audio messages through the controlled at least one device at step S3070, in accordance with another embodiment, video and audio messages may be generated by user device 200 based on information included in the result message received from at least one of central server 200 and selected service server 300. That is, user device 200 may receive the result message from the selected service server, generate audio and video message based on information included in the result message, and outputting the generated audio and video message through at least one of associated devices.

As described, central server 200 may receive at least ogre voice command extracted from user speech, analysis the at least one voice command, select a service server associated with the task of the at least one voice command based on the analysis result, perform the task by controlling the selected service server, and provide a result of performing task to user device in accordance with at least one embodiment.

Hereinafter, operations of central server 200 will be described in more detail with reference to FIG. 4 to FIG. 10.

FIG. 4 is a flowchart illustrating overall operation of a central server in accordance with at least one embodiment. FIG. 5 illustrates registration information of each service server, registered and stored at a central server in accordance with at least one embodiment.

Referring to FIG. 4, central server 200 may perform operations for registrations of each service server at step S3010. For example, central server 200 may perform a registration operation upon generation of predetermined events. The predetermined events may include i) receiving a registration request from at least one of service servers 300, ii) receiving a registration request from a user of a user device through smart phone 400 to register at least one service servers 300 posted at a companion app a corresponding web-site, iii) collecting registration information from service servers 300 at a predetermined interval or regularly, and iv) transmitting an initiation message to a corresponding service server to transmit registration information to central server 200. For example, central server 200 may receive a registration request from at least one of a user, a service provider, a system designer, a system operator, and likes. In response to such registration request, central server 200 may collect and store information on tasks that each service server can perform. In particular, central server 200 may receive a registration request from a user (through a companion application installed in a user equipment (e.g., smart phone 400)) or directly from a service provider of at least one of service server 300 upon generation of a predetermined event. The registration request may include registration information of a requested service server, such as identification 501, a task type 502, a service identification words (e.g., service initiation word 503, service initiation sentence 504, sentence pattern 505, and keyword 506), address 507, instruction message format 508, and likes. In response to such a request, central server 200 may store registration information of the requested service server. In order to register the requested service server and store the registration information, a plurality of service server 300 may additionally transmit the registration information to central server 200 through network 10 after requesting the registration. Furthermore, after the registration, a plurality of registered service servers 300 may regularly transmit updated registration information to central server 200.

Such registration may be performed in various manners. The registration of operation may be initiated and performed upon geration of predetermined events. The predetermined event includes i) receiving a request message from at least one of the plurality of service servers, ii) receiving a request message from a user of the user device, iii) requesting the plurality of service servers to transmit registration information, and iv) regularly collecting the registration information from the plurality of service servers. For example, central server 200 may regularly collect information on service servers, such as what type of task each service server can perform and provide a corresponding service, essential information for performing tasks, which will be required to a user to collect for performing a corresponding task, and instruction and result message formats for exchanging instruction message and results message between service servers 300 and central server 200 including user device 100. After regularly collecting the registration information of the service servers, central server 200 may publish the collected registration information of the service servers on a predetermined web-site or provide the collected registration information to users through companying apps. A user may be select one of the registered service servers and activate tasks related to the selected service servers. However, the embodiments of the present disclosure are not limited thereto.

As described, upon the registration of service servers 300, central server 200 receives information for performing tasks of each service server and stores the received information as the registration information. The registration information is illustrated in FIG. 5. As shown, the registration information may be stored in a form of a mapping table. Central server 200 may refer the mapping table of FIG. 5 to determine a task to perform and to identify a service server to perform the determined task. For example, the registration information may include information on each of registered service servers, for example, i) identification 510, ii) a service type 520, iii) a service initiation word 530, iv) a service initiation sentence 540, v) a sentence pattern 550, vi) a keyword 560, vi) contacting address 570 (e.g., IP address or a uniform resource locator (URL) address), and an instruction message format 580 for instruction and results. However, the present invention is not limited thereto. Hereinafter, the instruction message format 580 may be a standard message format determined based on agreements between service servers 300 (e.g., service provider of a service server) and central server 200 (e.g., service provider of central server 200). In the instruction message format 580, central server 200 may store parameters or information related a corresponding service server to perform the determined tasks.

Identification 501 includes information on identification of each registered server, such as an IP address, a unique identification number, or so forth. Service type 502 denotes a type of service that a corresponding service server provides. Furthermore, service type 502 may be a task type denoting a type of a task that a corresponding service server performs. Service initiation word 503, service initiation sentence 504, sentence pattern 505, and keyword 506 are information specifying, indicating, or selecting a particular server among a plurality of service servers 300.

In particular, service initiation word 503 and service initiation sentence 504 are information for initiating or calling a particular service server. Each service server 300 has unique service initiation word and service initiation sentence. For example, a service initiation word of "weather station" is for indicating a weather service server 302. Service initiation sentence of "order a pizza" is for indicating a Pizza company server 301.

Sentence pattern 505 and key word 506 are for specifying a particular service type of service servers. Multiple service servers can be registered with the same sentence pattern 505 and the same keyword 506. For example, a keyword of Pizza may specify a service server B for domino and a service server D for pizza Hut®.

Contacting address 507 may be an Internet access address of each service server 300. Contacting address 570 may be information about uniform resource locator (URL) address or IP (Internet Protocol) address of a corresponding service server.

Message format 508 for instruction and results may be information on a format of messages to be exchanged between central server 200 and service servers 300. That is, message format 580 may be previously determined in cooperation with service servers 300 and central server 200 to be compatible to each other for enabling controlling and exchanging information to each other. Such message format 508 may be an interface between service server 300 and central server 200 (e.g., between the artificial intelligence voice interactive system and $3^{rd}$ party servers). Message format 508 may include information on a result message which is generated by a service server to provide a result of perform a corresponding task.

Referring back to FIG. 4, central server 200 receives data corresponding to a voice command of a user from user device 100 and analyzes the received data at step S4020. The data may include speech data (voice data) or text data corresponding to the voice command. The data may be i) binary data in a certain format transferrable to third entities through a communication network, ii) audio data generated by recording voice command in a certain audio format, and iii) processed data generated by performing a speech to text process and interpreting the user speech to determine a voice command therein. Central server 200 analyzes the received data, for example, performing a parsing operation, comparing each token with keywords of each registered service servers.

At step S4030, central server 200 determines at least one task included in the received data based on the analysis results. That is, central server 200 may perform a predetermined parsing operation to separate each word in the data. That is, central server 200 may parse the received data, extract unit tokens of each word, and tag necessary meta information. Central server 200 may compare each unit token with at least one of a service initiation word, a service initiation sentence, a sentence pattern, and a keyword and determine a service server based on the comparison result. Based on the analysis result, central server 200 determines a service or a task included in the voice command.

At step S4040, central server 200 selects at least one of service servers 300 which can perform the determined service or tasks according to a selection policy (e.g., a selection priority and a selection order), based on comparison result (e.g., a service initiation word, a service initiation sentence, a sentence pattern, or a keyword), included in the analyzed data.

For example, when the data of voice command includes one of a particular service initiation word and service initiation sentence, central server 200 selects a service server mapped to the service initiation word included in the voice command. For another example, when the data of voice command includes at least one of a sentence pattern and a keyword, central server 200 selects a service server mapped to the sentence pattern or the keyword.

When central server 200 selects at least one of service servers 300, central server 200 may apply at least one of a selection order and a selection priority. The selection order denotes an order of server identification words to be considered to select a service server. For example, the selection order may be an order of a service initiation word, a service initiation sentence, a sentence pattern, and a keyword. When such a selection order is applied central server 200 selects a service server matched with the service initiation word first. Secondly, central server 200 selects a service server matched with a service initiation sentence. Third, central server 200 selects a service server matched with a sentence pattern. Lastly, central server 200 selects a service server matched with a keyword. For another example, i) if a voice command is related to one task, ii) if the voice command includes a service initiation word mapped to one service server A, and iii) if the voice command also includes a service initiation sentence mapped to the other service server B, central server 200 selects the one service server A mapped to the service initiation word. Such a selection process will be described in more detail with reference to FIG. 6 to FIG. 8.

At step S240, central server 200 generates and transmits an instruction message to the selected service server. For example, after central server 200 selects a service server, central server 200 may generate an instruction message and transmit the generated instruction message to the selected service server. Central server 200 may determine i) a type of a task, ii) information to be included in the task instruction, such as voice command itself or not according to the task type, iii) a format of an instruction message, iv) a destination, and v) a format of a result to be received. In particular, central server 200 may generate an instruction message to include i) information on a determined task to perform, ii) information of a voice command received from user device 100, iii) information on a result to be returned (such as a format (audio or visual)), iv) information on a user who requested the questions. That is, central server 200 may generate an instruction message compatible to the selected service server in accordance with at least one embodiment. Accordingly, the selected service server can perform an operation based on information included in the instruction message and return a result to a desired entity based on the information included in the instruction message. Such a format and parameters included in the instruction message are illustrated in FIG. 11 and will be described in more detail with reference to FIG. 11.

At step S4060, central server 200 receives a task result message including information on a result of performing the task from the service server. The task result message may include various contents including control data, text data, voice data, moving image data, and webpage data. In particular, central server 200 may receive a result message from a service server after transmitting a task instruction. Such a format and parameters included in the result message are illustrated in FIG. 12 and will be described in more detail with reference to FIG. 12.

At step S4070, central server 200 generates a result control message and transmits the result control message. For example, Central server 200 may determine whether the result message is transmitted to the user device 100 or other entities. Then, central server 200 may transmit the result message to the user device 100 and the other entities in order to play an audio result and display a video result through the other entities (such as a TV, a smart phone, or a table). Based on such determination, central server 200 generates a result control message and transmits the message to the user device and associated other device.

User device 100 may receive the result control message and provide the result of performing the task by controlling at least one of devices (e.g., speaker and display) and outputting audio data and video data included in the received result through the controlled devices. For example, when a user asked for the weather, the task result may include contents representing weather information. When a user asked for stock news, the task result may include information on stock news.

As described above, the artificial intelligence voice interactive system may provide various services to a user by cooperating with legacy systems through service servers 300 without modifying all the legacy systems. In particular, the various services may be provided to a user by i) selecting one of service servers 300 to perform a task based on data corresponding to a voice command of a user, and ii) transmitting a result of performing the task from the selected service server 300 to user device 100.

As described, central server 200 may receive data from user device 100 and analyze the data, determine at least one of services (or tasks) included in the data, and select at least one of service servers to perform the determined service or task. Hereinafter, such operation will be described in more detail with reference to FIG. 6 to FIG. 8.

Figure 6:
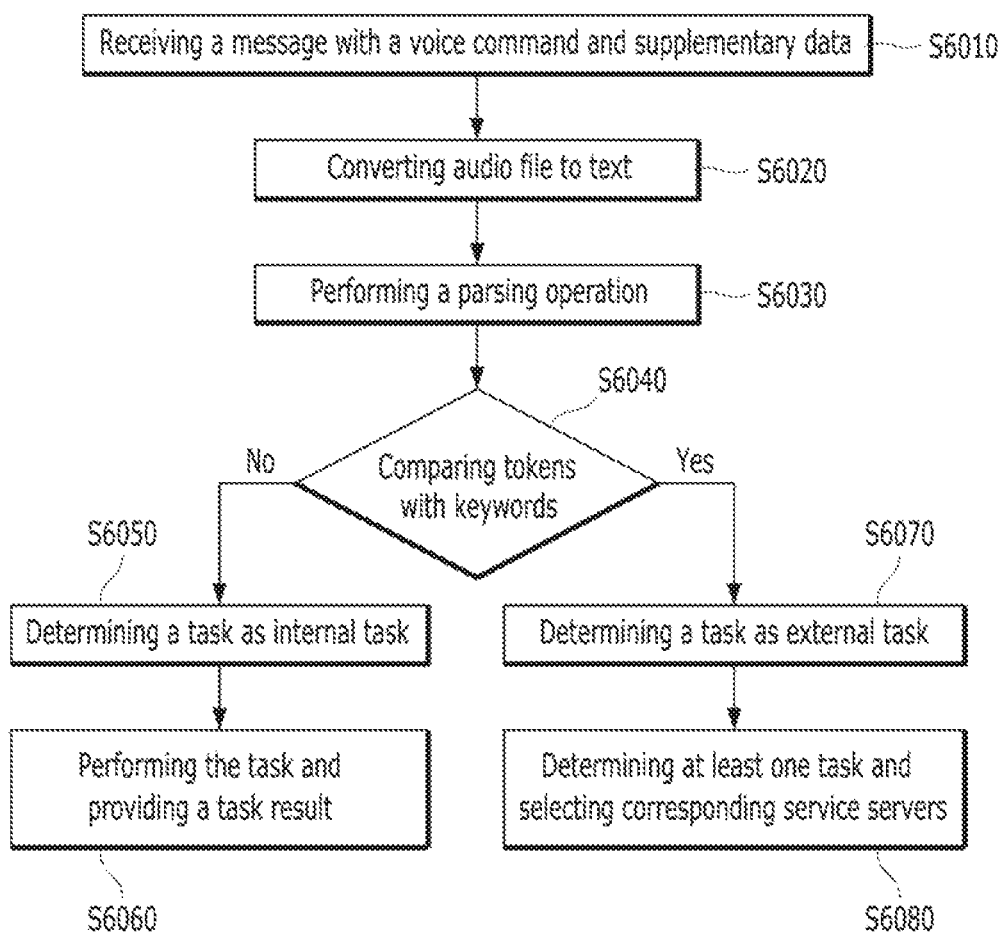
FIG. 6 is a flowchart illustrating an operation of receiving and analyzing data in accordance with at least one embodiment.

FIG. 6 is a flowchart illustrating an operation of receiving and analyzing data in accordance with at least one embodiment. Referring to FIG. 6, central server 200 receives data from user device 100 at step S6010. As described, central server 200 receives voice commands (e.g., user speech) in a particular data format from user device 100. The received data may be audio files of recording, as a voice command, speech in a predetermined time after a wake-up word. The received data may be generated in a predetermined audio file format (such as, mpeg, way). However, the embodiments of the present disclosure are not limited to the length of recording speech and the format of audio file. The length and format may be changed according to various factors.

At steps S6020 and S6030, central server 200 processes the received data for converting the audio file to a text file and performs a parsing operation on the converted data (e.g., text files). For example, in order to interpret the voice commands and determine a user intention thereof, central server 200 converts the audio data to the text data, separates each word in the text data, and determines meanings of each word by performing a parsing operation, such as extracting unit tokens of each word and tagging meta information to unit tokens of each word.

At step S6040, central server 200 compares the separated words in the voice command (e.g., parsing results) with server and task selection words (e.g., service initiation word, sentence, pattern and keyword).

When the voice command does not include any server and task selection word (No—S6040), central server 200 determines a task or a service requested in the voice command as an internal task at step S6050. Hereinafter, the internal task or service denotes a task can be performed using internally connected devices (e.g., resources) without using service servers 300. Such internal devices may be an Internet of Thing (IoT) devices 501 to 503 directly or indirectly connected to one of user device 100 and central server 200. Further, the internal devices may be user device 100 and central server 200 itself which can perform the task to collect information stored in memories of user device 100 and central server 200.

At step S6060, central server 200 generates a control message based on the result of performing a task and provides the result through at least one of devices associated with user device 100 and central server 200. For example, central server 200 generates a basic answer in response to the voice command and provides the generated basic answer to user device 100 and/or a predetermined device, such as a display.

When the voice command includes at least one server selection word (Yes—S6040), central server 200 determines the task included in the voice command as an external task at step S6070. The external task may denote a task to be performed using at least one of service servers 300 and legacy systems connected to service server 300. At step S6080, central server 200 determines at least one task included in the voice command and selects at least one of service servers 300 to perform the determined task based on the analysis result, information included in the data, and the registration information stored in the central server 200.

Figure 7:
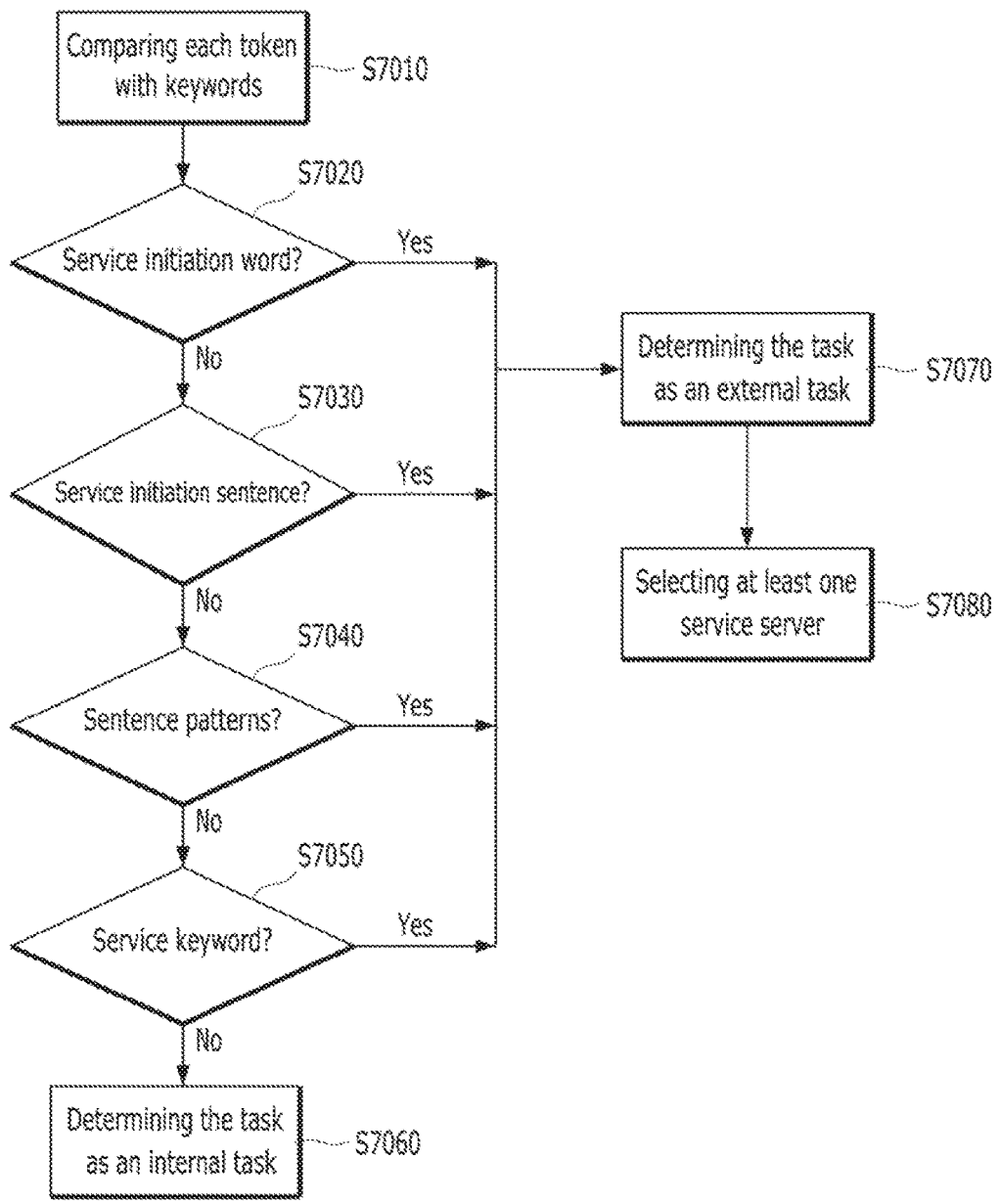
FIG. 7 illustrates a flowchart illustrating detailed operations of analyzing a voice command and determining a task and a corresponding server in accordance with another embodiment.

FIG. 7 illustrates a flowchart illustrating detailed operations of analyzing a voice command and determining a task and a corresponding server in accordance with another embodiment. Referring to FIG. 7, at step S7010, central server 200 performs a parsing operation on the text files of the received voice command and compares each word (e.g., tokens) in the voice command with the task and server selection words.

In particular, based on the comparison results, central server 200 determines whether the voice command includes any of service initiation words registered and stored as registration information at step S7020. Further, central server 200 determines whether the voice command includes any of service initiation sentences registered and stored as registration information at step S7030. In addition, central server 200 determines whether the voice command includes any of sentence patterns registered and stored as registration information at step S7040. Moreover, central server 200 determines whether the voice command includes any of keywords registered and stored as registration information at step S7040.

When none of the task and server selection words are not included in the voice command (No—S7020, S7030, S7040, and S7050), central server 200 determines the task included in the voice command is the internal task and performs the indicated task using at least one of internal resources, such as user device 100, central server 200, and associated IoT devices 500 at step S7060.

When any of the task and server selection words is included in the voice command (Yes—S7020, S7030, S7040, and S7050), central server 200 determines the task included in the voice command as the external task at step S7070. Central server 200 determines at least one task included in the voice command and selects at least one of service servers to perform the determined tasks at step S7080.

Figure 8:
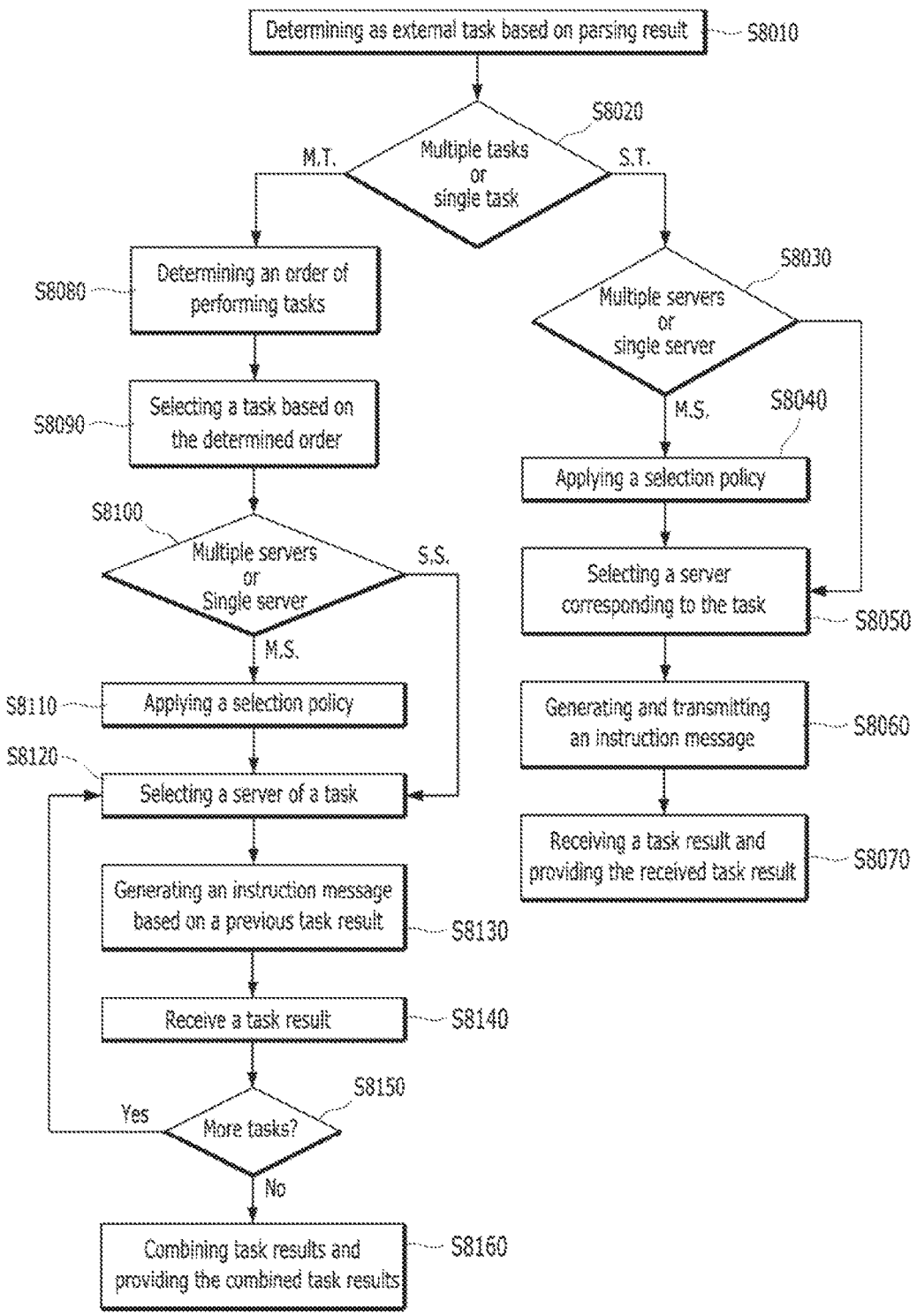
FIG. 8 is a flowchart illustrating operations for determining at least one task and selecting at least one service to perform the determined task in accordance with at least one embodiment.

FIG. 8 is a flowchart illustrating operations for determining at least one task and selecting at least one service server to perform the determined task in accordance with at least one embodiment. Referring to FIG. 8, at step S8010, central server 200 determines tasks included in the voice command as the external tasks that require external resources (e.g., service servers 300 and legacy system). For example, when the voice command includes at least one of service identification words based on the comparison result, central server 200 determines that the task to perform is the external task.

At step S8020 central server 200 determines whether a voice command includes multiple tasks to perform or a single task to perform based on the analysis result. For example, one voice command may include multiple tasks to perform. In case of a voiced command "please buy a train ticket to New York one day not having a rain in the next week," the voice command includes two tasks i) find a day not having a rain in the next week and ii) purchase a train ticket to New York on the found day. That is, central server 200 may determine the number of tasks to perform in the same voice command through various methods. For example, central server 200 may count the number of keywords included in the voice command and analyze the relation thereof for determining whether single task or multiple tasks are included in the voice commands. Such operation may be performed through various method. The embodiments of the present disclosure are not limited to one particular method.

When the voice command includes a single task (S.T—S8020), central server determines whether the determined task is associated with multiple servers or a single server at step S8030. For examples, central server 200 detects server or service identification words and fetch service servers matched to each detected service servers. If the task includes one server identification word, the task is associated with single service server. If the task includes multiple server identification words, the task is associated with multiple service server.

When the determined task is associated with the single server (S.S—S8030), central server 200 selects the single server to perform the determined task at step S8050. When the determined task is associated with multiple servers (M.S—S8030), central server 200 applies a selection policy to select at least one of multiple servers at step S8040. The selection policy may be determined by at least one of a service provider, a user, and a system designer. The selection policy may be a priority, a user preference, previous history, and so forth. In case of the priority, a user or a service provider may assign a predetermined priority to each service server. Then, central server 200 selects a service server to perform the determined task from the associated multiple service servers based on the selection policy at step S8050.

At step S8060, central server 200 generates an instruction message based on the determined task and the service selected server according to formats and parameters (508 of FIG. 5) included in the registration information of the selected service server, and transmits the generated instruction message to the selected service server. As described, the registration information of the selected service server may include information essential for performing the determined task in the selected service server. The format of the instruction message may be predetermined to enable communication between the selected service server and central server 200. Through such an instruction message, non-voice interactive systems such as the selected serviced server may be enabled to provide legacy services to a user in response to a voice command of the user. In response to the instruction message, central server 200 receives a result message of performing the determined task from the selected service server and provides the result to user device 200 at step S8070. The instruction message may be generated to perform services or tasks of legacy systems that cannot interact in response to a voice command. The instruction message may include information on a task to perform, an original voice command (e.g., user speech recorded or converted into a txt . . . ), supplementary information (such as user information, environmental information, context data, and so forth) and information on a result, such as a type of data (audio, video, so forth).

Referring back to the step S8020, when the determined task is the multiple tasks (M,T—S8020), central server 200 determines an order of performing multiple tasks included in the voice command at step S8080. For example, central server 200 may apply a predetermined order determined by analyzing relation among the determined tasks in the voice command. Such an order may be determined in various methods. After determining the order, central server 200 sequentially determines whether each task is associated with the multiple servers or a single server at step S8090.

When the determined task is associated with the single server (S.S—S8100), central server 200 selects the single server to perform the determined task at step S8120. When the determined task is associated with multiple servers (M.S—S8100), central server 200 applies a selection policy to select at least one of multiple servers at step S8110. Then, central server 200 selects a server to perform the determined task from the associated multiple service servers at step S8120.

At step S8130, central server 200 generates an instruction message based on the determined task, the selected server, and the previous task result if received according to the formats and parameters in the registration information of the corresponding service server, and transmits the generated instruction message to the selected service server. In response to the instruction message, central server 200 receives a task result from the selected service server at step S8140. At step S8150, central server 200 determines whether the service server is selected for all of the determined tasks in the determined order. If there are more tasks to determine (Yes—S8150), the operation of S8120 is performed again. If not (No—S8150), central server 200 combines all the result messages from the selected multiple service servers and provides the combined result at step S8160.

As described, the artificial intelligence voice interactive system in accordance with at least one embodiment may provide various services to a user in response to a voice command by cooperating with legacy systems through $3^{rd}$ party servers (e.g., service servers). Hereinafter, examples of providing such a service will be described.

When central server 200 receives audio data (e.g., voice command) including a predetermined keyword associated with multiple registered service servers, central server 200 may need to select one among the associated multiple service servers, which is simultaneously mapped to the predetermined keyword included in the received data. As described, the same keyword may be mapped to multiple service servers. If more than two service servers perform the same task and return different results, it might cause problems and inconvenient to a user. Accordingly, central server 200 may need to select one of service servers 300 based on a predetermined condition.

For example, a voice command is "please order a pizza", and a keyword "pizza" of the voice command is mapped to two service servers (e.g., a domino Pizza® server and a pizza Hut® server). In this case, the order might be mistakenly placed to two different service servers at the same time. Accordingly, central server 200 needs to select one of service servers based on predetermined conditions and place an order at the selected service server.

For example, such predetermined condition (e.g., selection policy) of central server 200 may be a previous order history, a priority assigned to each server by at least one of a user, a service provider, an operator, an advertisement promotion, and so forth. That is, central server 200 may select one of service servers based on priorities assigned to service servers.

Furthermore, a voice command may include more than two tasks. For example, central server 200 receives a voice command of "please, reserve a train ticket to New York on one of days not having a rain in the next week." In this case, central server 200 determines that there are two tasks in the voice command, i) a first task is finding a day not having a rain during the next week by checking weather and ii) a second task is reserving and buy a train ticket to New York.

In this case, central server 200 may need to select more than two service servers to perform the determined two tasks based on the information included in the voice command and determine an order of providing the task results. Further, one of task results may be combined with the other to perform the tasks correctly. For example, in case of a voice command "please, reserve a train ticket to the New York city on one of day not having a rain in the next week,", it is necessary to firstly or preferentially perform i) a first task of finding a day not having a rain during the next week by checking weather before performing a second task of reserving a train ticket to New York. Accordingly, central server 200 may be set an order of transmitting results as i) transmitting a result of performing the first task and ii) transmitting a result of performing the second task.

Accordingly, central server 200 transmits a first instruction message to a weather server to perform the first task and receives a result of the first task from the weather server, such as a Monday is a day not having a rain during the next week. Then, central server 200 transmits a second instruction message to a train ticket reservation server to reserve and purchase a ticket to New York on Monday based on the result of the first ask.

That is, when a user voice command includes more than two tasks, central server 300 determines priorities of tasks and transmits an instruction message to each service server 300 based on the determined priorities of the tasks in a predetermined order. The instruction message may be generated based on a result of performing previous tasks.

Figures 9, 10:
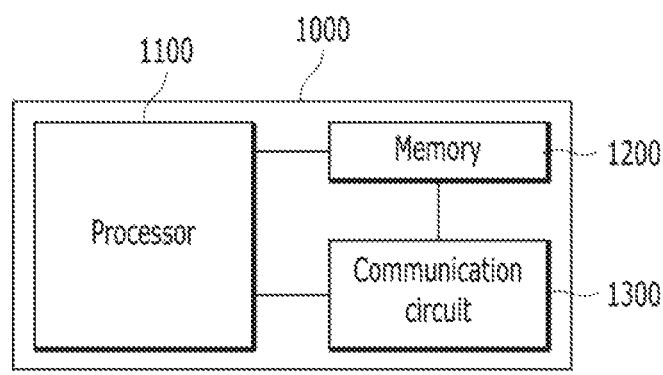
FIG. 9 illustrates a mapping table including information on registered service servers in accordance with at least one embodiment.
FIG. 10 is a diagram illustrating a central server in accordance with at least one embodiment.

FIG. 9 illustrates a mapping table including information on registered service servers in accordance with at least one embodiment. Referring to FIG. 9, the mapping table includes information on identification 910 of each registered service server, task type 920 of each registered service server, and essential information 930 to perform a task of each registered service server.

When central server 200 receives a voice command from user device 100, central server 200 determines whether the voice command sufficiently includes essential information for performing an associated task. If more information is required to perform the associated task, central server 200 may request the information directly to user device 100 by transmitting a message for requesting omitted information to user device 100. Such operation may be performed in or after S4030 and S4040 of FIG. 4.

For example, when central server 200 receives a voice command "please order a pizza", central server 200 may determine whether the voice command includes all essential information for ordering a pizza such as a name 933 of restaurant, a deliver address 934, a selected menu 935, and payment information 936. If a name 933 and a deliver address 934 are excluded in the voice command, central server 200 may generate and transmit a request message to user device 100 in order to inquiry the missing essential information, such as the restaurant name and the deliver address. In another embodiment, central server 200 may not additionally request essential information if central server 200 stores previous order history including on the restaurant name or the deliver address. In this case, central server 200 may generate an instruction message based on information in the voice command and the previous order history and transmit the generated instruction message to the selected service server food service server).

FIG. 10 is a diagram illustrating a central server in accordance with at least one embodiment. Referring to FIG. 10, central server 200 may be a computing system capable of receiving digital data from other entities through a predetermined communication network, transmitting digital data to other entities through a predetermined communication network, processing the digital data to perform operations for providing various services by cooperating with service servers and legacy systems, and storing digital data in a memory. For, central server 200 includes communication circuit 1300, processor 1100, and memory 1200. At least one of communication circuit 1300, processor 1100, and memory 1200 may be implemented with at least one processor and controlled according to programing codes stored in memory 1200.

Communication circuit 1300 may communicate with user device 100 and service server 300 through a network 600. Communication circuit 1300 may receive data corresponding a voice command of a user from user device 100. Communication circuit 1300 may include at least one module (or at least one circuit) for communicating with other entities (e.g., user device 100, service server 300, etc.) through a communication network (e.g., network 600). Herein, the communication network (e.g., network 600) may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LIE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

Processor 1100 may perform or control overall operation of central server 200. For example, processor 150 may be a central processing circuitry that controls constituent elements (e.g., memory, communication circuit, etc.) of central server 200 and/or performs a variety of operations (or functions) of central server 200. Particularly, processor 1100 may perform operations of registering tasks of a plurality of service servers 300, analyzing the received data, and selecting at least one of service servers 300 to perform a task according to the voice command from the user. Processor 1100 may directly perform a task included in the voice command without selecting and controlling a service server to perform a task.

Communication circuit 1300 may transmit an instruction message to the selected service server 300 and receives a result of performing the task from the selected service server 300. Communication circuit 1300 may also deliver the received result to user device 100.

Memory 1200 may store a variety of information. For example, memory 1200 may store task information registered by processor 1100. Memory 1200 may further store personal information of a user, such as a name, an address, a telephone number. Furthermore, memory 1200 may further include any software programs and related data. Memory 1200 may further store an operation system data, applications, and related data, received from other entities (e.g., user devices, other servers) through a variety of communication media (e.g., communication networks). In accordance with at least one embodiment, memory 1200 may store information on display setting determined for display unit of central server 200. Memory 1200 may include at least one of an internal memory and an external memory according to embodiments. For example, memory 1200 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

FIG. 11 and FIG. 12 illustrate formats and parameters of an instruction message and a result message in accordance with at least one embodiment. Referring to FIG. 11 and FIG. 12 the instruction message may be generated as a digital binary data packet that has a format can be transmitted and received between user device 100, central server 200, and service servers 300 through communication network 600. For example, the format of the instruction message may be a typical data packet format for digital communication, but the embodiments are not limited thereto.

Such an instruction message may include at least 11 fields. For example, instruction message may include 1) a trid field for describing transaction identification (ID), 2) a vendorid field for describing a vender identification (ID) (e.g., service server or legacy systems), 3) a vserviceid field for describing a service identification (ID) (e.g., service or task), 4) an intent field for describing intention of a user, 5) reqmsg field for describing a voice command (e.g., recorded speech or voice), 6) a param field for describing keywords for a service, 7) a status field for describing current status of surroundings (context information), 8) a uinfo field for describing user preferences, 9) id field for personal ID, 10) sa_id for describing a service provider identification, and 11) a history field for describing a previous task result (previous service result or history). Herein, the vendorid field of the instruction message (e.g., request message) may include Identification of a service provider of a corresponding service server, which is different from that of central server 200 and user device 100. That is, the transmission of the instruction message to a selected service server may use a communication scheme different from that used for communication in central server 200 with devices owned by the same service provider or for internal communication in central server 200.

As described, the instruction message may be generated according to the format and parameters described in FIG. 11 and transmitted to a selected service server. In response to the instruction message, the selected service server performs the task (or service) according to the information parameters) included in the instruction message and generates a result message. Similarly, the result message may be generated as a digital binary data packet that has a format can be transmitted and received between user device 100, central server 200, and service servers 300 through communication network 600. For example, the format of the result message may be a typical data packet format for digital communication, but the embodiments are not limited thereto.

Such a result message may include at least 8 fields. For example, instruction message may include 1) a trid field for describing transaction identification (ID), 2) a vendorid field for describing a vender identification (ID) (e.g., service server or legacy systems), 3) a vserviceid field for describing a service identification (ID) (e.g., service or task), 4) a sysact field for describing operations (actions) of at least one of user device 100 and central server 200 to perform, 5) a vimtype field for describing a type of message to output (audio or video), 6) a UserMesag field for describing an original voice command, 7) a sys template field for describing text, audio, or video as results of performing a task, 8) a CS for describing coding part.

As described, the result message may be generated according to the format and parameters described in FIG. 12 and transmitted to at least one of user device 100 and central server 200 to output audio or video messages as result of performing the requested service or task.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of cation and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing voice interactive services to a user through an artificial intelligence voice interactive system including a central server and a plurality of service servers each associated with a legacy system, the method comprising:

performing a registration operation in response to a predetermined event to register the plurality of service servers and store the registered information of each of the plurality of service servers;

receiving command data, determining a task to perform based on the command data, and selecting at least one of the plurality of service servers based on the determined task;

generating an instruction message based on the command data, the determined task, and the registered information of the selected at least one of the plurality of service servers, and transmitting the generated instruction message to the selected at least one of the plurality of service servers; and receiving a response message from the selected at least one of the plurality of service servers and outputting at least one of audio and video data based on the response message.

2. The method of claim 1, wherein:

the registering comprises: storing task essential information for performing a task for each of the plurality of service servers; and the method further comprises: requesting additional information to a user device when the command data does not include task essential information for performing the determined task associated with the command data.

3. The method of claim 1, wherein the predetermined event includes i) receiving a request message from at least one of the plurality of service servers, ii) receiving a request message from a user device, iii) requesting the at least one of the plurality of service servers to transmit registration information, and iv) regularly collecting the registration information from the at least one of the plurality of service servers.

4. The method of claim 1, wherein the registration information of each one of the plurality of service servers include at least one of information on tasks to perform, service identification words, a communication address, and message formats.

5. The method of claim 1, wherein the instruction message is generated based on a message format based on the registration information of the selected at least one of the plurality of service severs in order to cooperate with a non-voice interactive system to perform the determined task.

6. The method of claim 1, wherein determining whether the received command data is related to an internal task or an external task based on service identification words included in the received command data.

7. The method of claim 6, when the received command data includes at least one of service identification words, the received command data is a request for the external task that requires one of the service servers.

8. The method of claim 1, wherein the selecting the at least one of the plurality of service servers comprises:

determining whether the command data includes one of service initiation words, service initiation sentences, sentence patterns, and keywords of the service servers based on the stored registration information of the service servers; and selecting the at least one of the plurality of service servers mapped to the one included in the voice command data.

9. The method of claim 8, wherein the selecting the at least one of the plurality of service servers further comprises:

applying a predetermined selection order to select the at least one of the plurality of service servers; and the predetermined selection order is to firstly select one associated with the service initiation word, secondly select one associated with the service initiation sentence, thirdly select one associated with the sentence pattern, and lastly select one associated with the keyword.

10. The method of claim 1, wherein the selecting the at least one of the plurality of service servers comprises:

determining whether the command data includes one of a service initiation word and a service initiation sentence of the service servers; and when the command data include at least one of the service initiation word and the service initiation sentence, selecting a service server mapped to at least one of the service initiation word and the service initiation sentence.

11. The method of claim 1, wherein the selecting the at least one of the plurality of service server comprises:
when more than two service servers are capable of performing the determined task associated with the command data, selecting at least one of the two service servers based on a predetermined selection condition.

12. The method of claim 11, wherein the selecting the at least one of the plurality of service server further comprises:
when one of a keyword and a sentence pattern included in the voice command data is mapped to more than two service servers, determining that more than two service servers are capable of performing the determined task associated with the voice command.

13. The method of claim 11, wherein the predetermined selection conditions is one of i) selecting one assigned with a higher priority than the others among the plurality of service servers, ii) selecting one previously selected more times than the others among the plurality of service servers, and iii) selecting one set as a default service server.

14. A method for providing, by a user device, various non-voice interactive services in response to a voice command from a user, the method comprising:
receiving a voice command from the user;
transmitting command data to a central server;
receiving a result message from at least one of the central server and service servers, wherein each of the service servers is associated with a legacy system; and
outputting at least one of audio and video data based on the result message through the user device,
wherein:
the result message is generated by one of the service servers, as a result of performing at least one task included in the command data through the selected service server, and
the selected service server and the central server are communicated through an instruction message which has information necessary for the selected service server to perform the task included in the command data.

15. The method of claim 14, wherein the instruction message is generated based on a format enabling communication between the service servers and the central server.

* * * * *